United States Patent
Koh et al.

(10) Patent No.: US 11,642,986 B2
(45) Date of Patent: May 9, 2023

(54) ANTI-PINCH CONTROL SYSTEM

(71) Applicant: HYUNDAI TRANSYS INC., Seosan-si (KR)

(72) Inventors: Sang Kyung Koh, Yongin-si (KR); Jae Kwon Son, Hwaseong-si (KR); Won Ho Jung, Seongnam-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 309 days.

(21) Appl. No.: 17/073,912

(22) Filed: Oct. 19, 2020

(65) Prior Publication Data

US 2021/0146802 A1 May 20, 2021

(30) Foreign Application Priority Data

Nov. 15, 2019 (KR) .................. 10-2019-0146662

(51) Int. Cl.
*B60N 2/02* (2006.01)
(52) U.S. Cl.
CPC ......... *B60N 2/0244* (2013.01); *B60N 2/0232* (2013.01); *B60N 2002/0268* (2013.01)
(58) Field of Classification Search
CPC ............... B60N 2/0244; B60N 2/0232; B60N 2002/0268; B60N 2/002
See application file for complete search history.

(56) References Cited

U.S. PATENT DOCUMENTS

| | | | | |
|---|---|---|---|---|
| 2009/0039814 | A1* | 2/2009 | Rosch | H02H 7/0851 318/434 |
| 2011/0270491 | A1 | 11/2011 | Kincaid et al. | |
| 2011/0285186 | A1* | 11/2011 | Demmelmeier | B60N 2/0248 701/49 |
| 2017/0043681 | A1* | 2/2017 | Seiller | B60N 2/0248 |
| 2018/0304774 | A1* | 10/2018 | Mizoi | A61B 5/0816 |

FOREIGN PATENT DOCUMENTS

| | | |
|---|---|---|
| JP | 2009526692 A | 7/2009 |
| KR | 1020080121557 | 12/2008 |
| KR | 1020110111636 | 10/2011 |
| KR | 1020140187806 | 12/2014 |
| KR | 1020160115171 A | 10/2016 |

OTHER PUBLICATIONS

KR20160115171A translation.*

* cited by examiner

*Primary Examiner* — Tyler J Lee
*Assistant Examiner* — Yufeng Zhang

(57) ABSTRACT

The present disclosure relates to an anti-pinch control system. The anti-pinch control system includes a motor configured to generate driving force for moving a seat of a vehicle, a pressure sensor configured to detect a pressure applied to the seat, a current measurement sensor configured to measure an amount of current generated by the motor, a database unit configured to store data on an amount of current required to drive the seat that corresponds to the pressure detected by the pressure sensor, and a controller configured to vary an anti-pinch value of the seat based on data corresponding to the pressure applied to the seat.

20 Claims, 5 Drawing Sheets

ANTI-PINCH CONTROL SYSTEM

CROSS-REFERENCE TO RELATED APPLICATION

This application claims under 35 U.S.C. § 119(a) the benefit of priority to Korean Patent Application No. 10-2019-0146662 filed on Nov. 15, 2019, the entire contents of which are incorporated herein by reference.

BACKGROUND

Technical Field

The present disclosure relates to an anti-pinch control system for varying an anti-pinch value of a seat based on the pressure applied to a seat and a temperature of air inside and outside a vehicle.

Background Art

As an electronic apparatus for driving a seat for improving the convenience for a driver has been popularized, accidents have frequently occurred for reasons including carelessness of a user and malfunction of a device. To overcome the problem, various safety regulations have been established and applied with respect to an anti-pinch system for preventing an obstacle from being pinched. The anti-pinch system is a safety system that is applied to components of a vehicle that are driven in an electronic manner, such as a power window, a sunroof, or a seat, and that prevents a part of a human body or an obstruction from being pinched by an automatically driven component.

Occupants in a vehicle may have different weights or riding tendencies, and the load applied to a seat may change depending on the occupant. The load applied to the seat may also change depending on the temperature of the air inside and outside a vehicle. However, because an anti-pinch value is set without consideration of various external factors, there is a problem in that driving of a seat is not stopped in situations in which unnecessary driving of the seat needs to be limited, and a person is pinched by the seat.

SUMMARY OF THE DISCLOSURE

In one aspect, the present disclosure provides an anti-pinch control system for varying an anti-pinch value for preventing a person from being pinched by a seat based on the pressure applied to the seat and a temperature of the temperature of air inside and outside the vehicle.

In another aspect, the present disclosure provides an anti-pinch control system for varying an anti-pinch value by storing the amount of current of a motor and an anti-pinch value, which match the pressure applied to a seat and the temperature of air inside and outside a vehicle, in the form of a database.

In a preferred embodiment, an anti-pinch control system includes a motor configured to generate driving force for moving a seat of a vehicle, a pressure sensor configured to detect a pressure applied to the seat, a current measurement sensor configured to measure an amount of current generated by the motor, a database unit configured to store data on an amount of current required to drive the seat that corresponds to the pressure detected by the pressure sensor, and a controller configured to vary an anti-pinch value of the seat based on data corresponding to the pressure applied to the seat.

The controller may include a matching unit configured to match a newly measured pressure and the data stored in the database unit, a calculator configured to derive the anti-pinch value based on the data matched by the matching unit, and a motor driver configured to control driving of the seat based on the anti-pinch value.

The anti-pinch control system may further include a temperature sensor configured to detect a temperature of air inside and outside the vehicle, wherein the controller may vary the anti-pinch value of the seat based on an amount of current corresponding to the temperature of air inside and outside the vehicle and the pressure applied to the seat.

The controller may increase the anti-pinch value as a temperature, measured in real time, decreases based on a temperature value corresponding to a currently set anti-pinch value.

The controller may increase the anti-pinch value as a pressure value, measured in real time, increases based on a pressure value corresponding to a currently set anti-pinch value.

The controller may analyze the pressure applied to the seat during a preset data recognition time and may increase the preset data recognition time and analyzes the pressure applied to the seat when a range of variation in the pressure is equal to or greater than a preset range.

The controller may derive an average of the pressure applied to the seat during the new data recognition time and calculates the anti-pinch value based on the average pressure value.

The controller may analyze the pressure applied to the seat during a preset data recognition time and may process data measured during the preset data recognition time as noise when a range of variation in the pressure is equal to or greater than a preset range.

The anti-pinch control system may further include a temperature sensor configured to detect a temperature of air inside and outside the vehicle, wherein the database unit may store the anti-pinch value calculated by the controller and a temperature and a pressure that match the anti-pinch value, and the controller may match a pressure applied to the seat and a temperature of the vehicle, which are newly measured, and data of the database unit, and sets the matching anti-pinch value to a new anti-pinch value.

The controller may match a pressure applied to the seat and a temperature of the vehicle, which are newly measured, and data of the database unit, the controller may calculate a value obtained by adding a preset value to the matched amount of current, as the anti-pinch value, and the preset value may be a value varied depending on the amount of current.

The anti-pinch value may be a limiting value of the amount of current required by a motor depending on a load applied to the seat, and the controller may stop driving the seat when the current measurement sensor detects an amount of current equal to or greater than the anti-pinch value.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
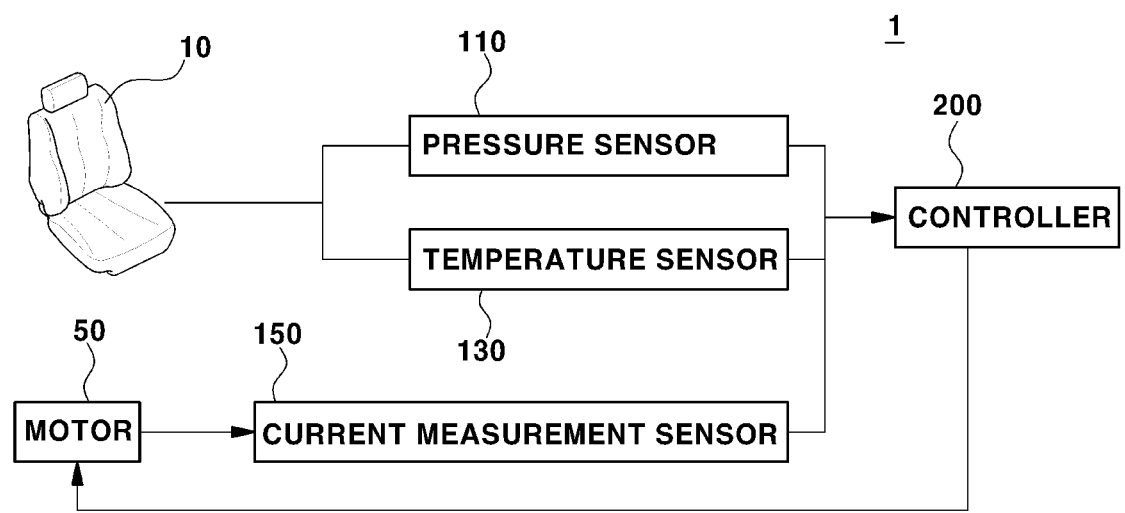
FIG. 1 is a block diagram showing an anti-pinch control system according to an embodiment of the present disclosure.

The attached drawings for illustrating exemplary embodiments of the present disclosure are to be referred to in order to gain a sufficient understanding of the present disclosure, the merits thereof, and the objectives accomplished by the implementation of the present disclosure. The present disclosure may, however, be embodied in many different forms, and should not be construed as being limited to the embodiments set forth herein; rather, these embodiments are provided so that this disclosure will be thorough and complete, and will fully convey the concept of the invention to one of ordinary skill in the art. Meanwhile, the terminology used herein is for the purpose of describing particular embodiments and is not intended to limit the invention. Like reference numerals in the drawings denote like elements.

Terms such as 'unit' or 'module', etc., should be understood to indicate units that process at least one function or operation and that may be embodied in a hardware manner, a software manner, or a combination of a hardware manner and a software manner.

Terms, such as "first", "second", and the like used in the specification may be used to distinguish the relevant elements using the reference relationship, and are not limited by the order.

The detailed description is used to exemplify the invention. The description herein is given to show exemplary embodiments of the present disclosure, and the invention may be used in various other combinations, changes, and environments. That is, the invention may be changed or modified within the scope of the concept of the invention disclosed in the specification, the equivalent scope of the given disclosure, and/or the scope of the technology or knowledge in the art. The described embodiment is the ideal embodiment for implementing the technological spirit of the invention, but may be changed in various forms required in detailed applications and use of the invention. Thus, the detailed description of the invention herein is merely exemplary, and is not intended to limit the invention. The following claims are to be interpreted as including other embodiments.

Figure 2:
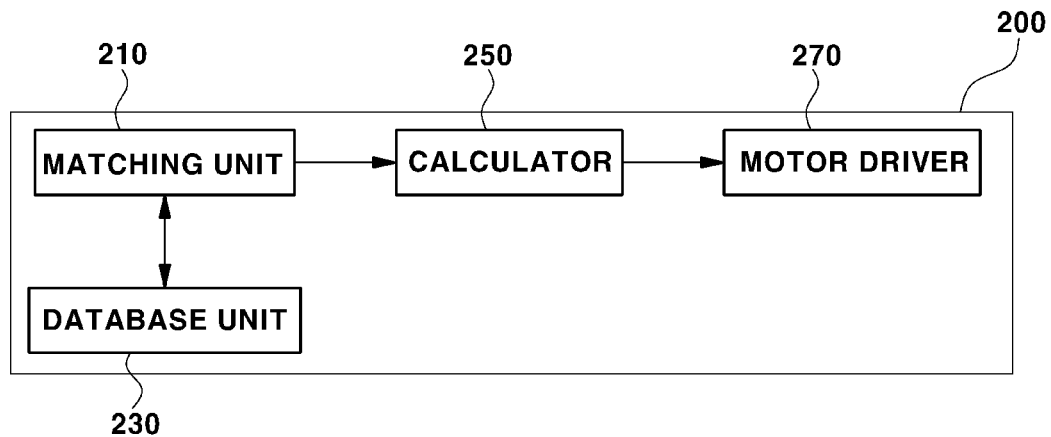
FIG. 2 is a block diagram showing a controller according to an embodiment of the present disclosure.

FIG. 1 is a block diagram showing an anti-pinch control system according to an embodiment of the present disclosure. FIG. 2 is a block diagram showing a controller according to an embodiment of the present disclosure.

Referring to FIGS. 1 and 2, an anti-pinch control system 1 may include a pressure sensor 110, a temperature sensor 130, a current measurement sensor 150, and a controller 200. The anti-pinch control system 1 may change an anti-pinch value of the seat 10 in consideration of various factors that affect the load applied to a seat 10. The anti-pinch value may be a limiting value of the amount of current required by a motor 50 depending on a load applied to the seat 10.

The pressure sensor 110 may measure the pressure applied to the seat 10. A plurality of occupants in a vehicle may have different weights and may also have different tendencies of sitting on the seat 10. Thus, when an occupant is changed, the pressure applied to the seat 10 may be changed. In general, as the pressure applied to the seat 10 increases, the energy required to drive the seat 10 may increase. Thus, as the pressure applied to the seat 10 increases, the amount of current required by the motor 50 for driving the seat 10 may increase. When the pressure value applied to the seat 10 is changed, the pressure sensor 110 may detect the changed pressure value and may transmit information thereof to the controller 200. For example, at least one pressure sensor 110 may be provided at a bottom or a back of the seat 10.

The temperature sensor 130 may measure the temperature of air inside and outside the vehicle. The temperature of air inside and outside the vehicle may change depending on the seat or the environment inside the vehicle. As the temperature of air inside and outside the vehicle decreases, movement of a plurality of components for driving the seat 10 may be restricted. Thus, as the temperature of air inside and outside the vehicle decreases, the amount of current required by the motor 50 for driving the seat 10 may increase. When the temperature of the air inside and outside the vehicle is changed, the temperature sensor 130 may detect the changed air temperature and may transmit information thereof to the controller 200.

The current measurement sensor 150 may measure the amount of current that is generated by driving the motor 50. That is, the amount of current measured by the current measurement sensor 150 may be the amount of current required by the motor 50 depending on the load applied to the motor 50. The amount of current of the motor 50, measured by the current measurement sensor 150, may change depending on the pressure applied to the seat 10 and the temperature of air inside and outside the vehicle. For example, when a heavy occupant sits on the seat 10, the amount of energy required to move the seat 10 may increase. Thus, the amount of current generated by the motor 50 for moving the seat 10 may increase. In another example, when the temperature of the air inside and outside the vehicle decreases, the amount of energy required to move the seat 10 may increase. Thus, the amount of current generated by the motor 50 for moving the seat 10 may increase. In addition, the amount of current generated by the motor 50 in order to move the seat 10 may also change in the same condition due to aging of the seat 10, movement of an occupant sitting on the seat 10, or the like. The amount of current measured by the current measurement sensor 150 may be transmitted to the controller 200.

The controller 200 may vary an anti-pinch value of the seat 10 based on the amount of current required to move the seat 10, the pressure applied to the seat 10, and the temperature of air inside and outside the vehicle. The controller 200 may detect the amount of current generated by the motor 50 for driving the seat 10 and may calculate an anti-pinch value based on the amount of current. For example, the anti-pinch value may be set to a greater value of current than the value of current that is generated in the situation in which the seat 10 is driven normally. In general, the anti-pinch value may be a fixed value of current, and when an amount of current equal to or greater than the anti-pinch value is detected, driving of the seat 10 may be stopped. However, when a relatively light person sits on the seat 10, the amount of current for driving the seat 10 may be relatively low. Thus, even if an object or a person is caught by the seat 10 while the seat 10 is driven, a predetermined time may elapse until the amount of current generated by the motor 50 is equal to or greater than the anti-pinch value, and the occupant pinched by the seat 10 may suffer or may be injured. Thus, the controller 200 according to an embodiment of the present disclosure may vary the anti-pinch value in consideration of factors that affect the anti-pinch value of the seat 10. Because a variable anti-pinch value is used, the risk that a person will be injured by the seat 10 may decrease.

The controller 200 may include a matching unit 210, a database unit 230, a calculator 250, and a motor driver 270. The matching unit 210 may combine the data measured by each of the pressure sensor 110, the temperature sensor 130, and the current measurement sensor 150. The matching unit 210 may compare the combined data with data stored in the database unit 230. The matching unit 210 may derive an average of each of the measured pressure value, the temperature value, and the amount of current, and may compare the average with data stored in the database unit 230. The matching unit 210 may receive a variance of each of a pressure value, a temperature value, and the amount of current for a preset data recognition time and may derive an average of each of the pressure value, the temperature value, and the amount of current.

The database unit 230 may store a table of information on the amount of current required to drive the seat 10, which matches the pressure detected by the pressure sensor 110 and the temperature of the air inside and outside the vehicle, detected by the temperature sensor 130. That is, the database unit 230 may store the pressure value and the temperature value that are detected in real time and may store the value of current of the motor 50 that corresponds to the measured pressure and temperature values. The database unit 230 may learn the premeasured pressure value, temperature value, and value of current.

The calculator 250 may derive the amount of current required by the motor 50 and the anti-pinch value based on the result of matching between data stored in the database unit 230 and a pressure value and a temperature value that are newly measured in real time.

For example, the calculator 250 may derive the anti-pinch value that matches the newly measured pressure value and temperature value, and the derived anti-pinch value may be set to a new anti-pinch value of the seat 10. The database unit 230 may store the pre-stored pressure value, temperature value, the amount of current of the motor 50, and anti-pinch value, and thus when the newly measured pressure value and temperature value match data stored in the database unit 230, the calculator 250 may derive the anti-pinch value.

For example, the calculator 250 may derive an amount of current of the motor 50 corresponding to the newly measured pressure value and temperature value, and may calculate the anti-pinch value based on the amount of current of the motor 50. In this case, the calculator 250 may calculate a value obtained by adding a preset value to the matching amount of current of the motor 50, and may set the calculated value to a new anti-pinch value. The preset value may be a value that is varied depending on the amount of current of the motor 50. For example, as the amount of current of the motor 50 increases, the preset value may increase. The condition in which the amount of current of the motor 50 is high may refer to the condition in which it is difficult to drive the seat 10. Thus, when the anti-pinch value is set, because the amount of current of the motor 50 increases, the preset value may increase, and accordingly, driving of the seat 10 may be prevented from being unnecessarily limited. However, the relationship between the amount of current of the motor 50 and the preset value may be changed by a designer. The newly calculated anti-pinch value may be stored in the database unit 230.

For example, when the newly measured pressure value and temperature value are not stored in the database unit 230, the database unit 230 may store the newly pressure value and temperature value, and the amount of current of the motor 50 and may learn the stored value. The calculator 250 may calculate a value obtained by adding the preset value to the measured amount of current of the motor 50 and may set the calculated value to a new anti-pinch value. The preset value may be a value that varies depending on the amount of current of the motor 50.

The motor driver 270 may drive the motor 50 based on the anti-pinch value that is newly set by the calculator 250. When the amount of current measured by the current measurement sensor 150 is equal to or greater than the set anti-pinch value, the motor driver 270 may stop driving the seat 10. When the amount of current measured by the current measurement sensor 150 is equal to or greater than the set anti-pinch value, this means that an excessive load is applied to the seat 10, which may be interpreted to mean that an object or a person is pinched by the seat 10. The motor driver 270 may compare the amount of current measured by the current measurement sensor 150 with the anti-pinch value and may control driving of the seat 10.

According to an embodiment of the present disclosure, the anti-pinch control system 1 may compare data stored in the database unit 230 with a pressure value and a temperature value that are measured in real time and may calculate a new anti-pinch value. The anti-pinch control system 1 may detect variation in the amount of current of the motor 50 and may calculate the new anti-pinch value. That is, the anti-pinch control system 1 may vary the anti-pinch value in consideration of various factors, thereby overcoming a problem in that driving of the seat 10 is not stopped even if a person is pinched by the seat 10.

Figure 3:
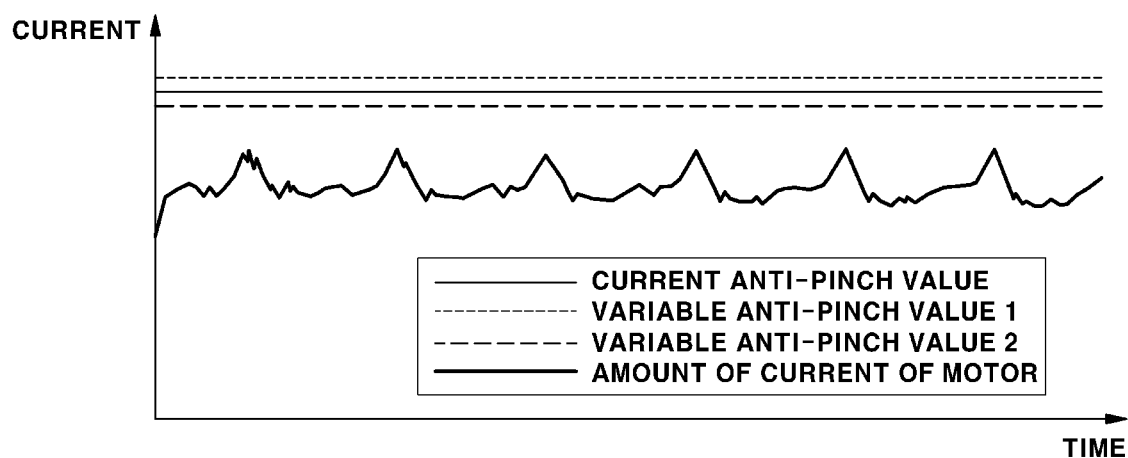
FIG. 3 is a graph showing that an anti-pinch value is varied according to an embodiment of the present disclosure.

FIG. 3 is a graph showing that an anti-pinch value is varied according to an embodiment of the present disclosure.

Referring to FIGS. 1 to 3, an anti-pinch value may be varied based on a pressure value and a temperature value that are measured by the pressure sensor 110 and the temperature sensor 130. A preset anti-pinch value may be present for the seat 10. The controller 200 may receive data on the temperature value and the pressure value that are measured in real time and may compare the received temperature value and pressure value with a pressure value and a temperature value that match a currently set anti-pinch value. The controller 200 may compare the newly measured pressure value and temperature value with pressure values and temperature values stored in the database unit 230, and may derive an anti-pinch value or an amount of current of the motor 50 corresponding to the newly measured pressure value and temperature value.

For example, when the pressure value applied to the seat 10 is greater than a pressure value that matches a currently set anti-pinch value, the controller 200 may increase the anti-pinch value. When the anti-pinch value is not increased even if the pressure value applied to the seat 10 increases, a problem in that movement of the seat 10 is unnecessarily limited may occur. Thus, the controller 200 may calculate a new anti-pinch value (anti-pinch value 1) based on variation in the newly measured pressure value. The controller 200 may calculate the new anti-pinch value (anti-pinch value 1) based on the anti-pinch value stored in the database unit 230 or may calculate the new anti-pinch value (anti-pinch value 1) based on the amount of current of a motor stored in the database unit 230. When the new anti-pinch value (anti-pinch value 1) is calculated based on the amount of current of the motor, stored in the database unit 230, the controller 200 may set a value obtained by adding a preset value to the amount of current of the motor, to an anti-pinch value.

For example, when the temperature value of a vehicle is greater than a temperature value that matches a currently set anti-pinch value, the controller 200 may reduce the anti-pinch value. When the anti-pinch value is not reduced even if the temperature value of the vehicle increases, a problem in that driving of the seat 10 is not stopped even if a person is pinched by the seat 10 may occur. Thus, the controller 200 may calculate a new anti-pinch value (anti-pinch value 2) based on variation in the newly measured temperature value.

Figure 4:
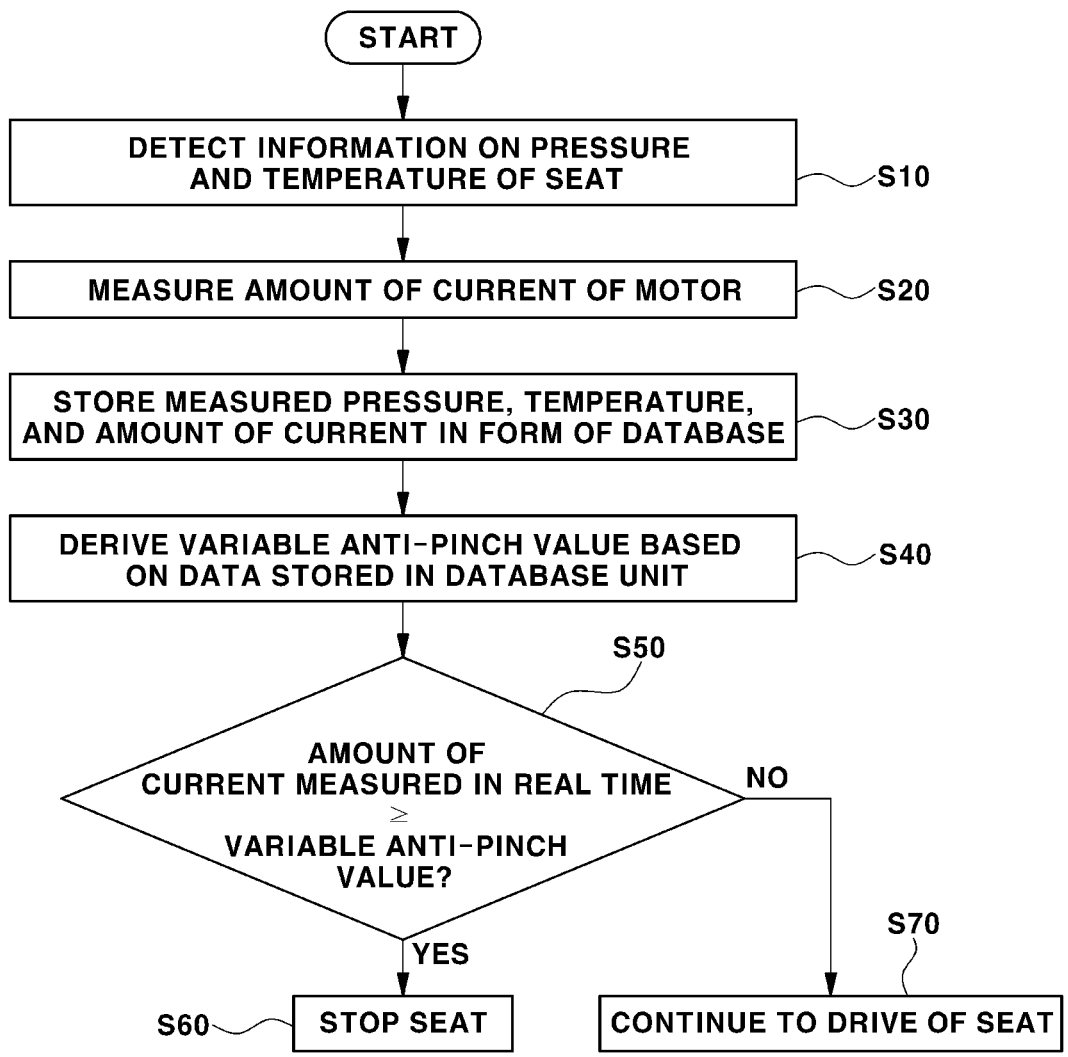
FIG. 4 is a flowchart showing an anti-pinch control method according to an embodiment of the present disclosure.

FIG. 4 is a flowchart showing an anti-pinch control method according to an embodiment of the present disclosure. Repeated description will be omitted for brevity of the description.

Referring to FIGS. 1, 2, and 4, the pressure sensor 110 may measure the pressure applied to the seat 10, and the temperature sensor 130 may measure the temperature of air inside and outside a vehicle. The measured pressure and temperature may be transmitted to the controller 200 (S10).

The current measurement sensor 150 may measure the amount of current generated in the motor 50. Information on the measured current may be transmitted to the controller 200 (S20).

The database unit 230, which is one component of the controller 200 may store the measured pressure, temperature, and amount of the current in the form of a database. That is, the database unit 230 may store data on pressure, temperature, and the amount of current, which are measured in real time, and may learn the stored data. The database unit 230 may store data on the amount of current corresponding to the pressure and the temperature, in a table. The database unit 230 may store an anti-pinch value that is previously calculated by the controller 200. The controller 200 may calculate the anti-pinch value based on the amount of current of the motor 50. The database unit 230 may store the amount of current and the anti-pinch value corresponding to the pressure and the temperature (S30).

The calculator 250, which is one component of the controller 200, may derive a variable anti-pinch value based on the data stored in the database unit 230.

For example, the calculator 250 may derive an anti-pinch value that matches the newly measured pressure value and temperature value from the data stored in the database unit 230, and may set the derived anti-pinch value to a new anti-pinch value of the seat 10. The database unit 230 may store a pre-measured pressure value and temperature value, the amount of current of the motor 50, and the anti-pinch value, and thus when the newly measured pressure value and temperature value match the data stored in the database unit 230, the calculator 250 may derive the anti-pinch value.

For example, the calculator 250 may derive the amount of current of the motor 50 corresponding to the newly measured pressure value and temperature value, and may calculate an anti-pinch value based on the derived amount of current of the motor 50. In this case, the calculator 250 may calculate a value obtained by adding a preset value to the matching amount of current of the motor 50 and may set the calculated value to a new anti-pinch value. The preset value may be a value that varies depending on the amount of current of the motor 50. For example, as the amount of current of the motor 50 increases, the preset value may increase (S40).

The motor driver 270, which is one component of the controller 200, may determine whether the amount of current of the motor 50, which is measured in real time, has a value equal to or greater than the newly set variable anti-pinch value (S50).

When the amount of current of the motor 50 is equal to or greater than the variable anti-pinch value, the motor driver 270 may stop driving the seat 10 (S60).

When the amount of current of the motor 50 is less than the variable anti-pinch value, the motor driver 270 may continue to drive the seat 10 (S60).

Figure 5:
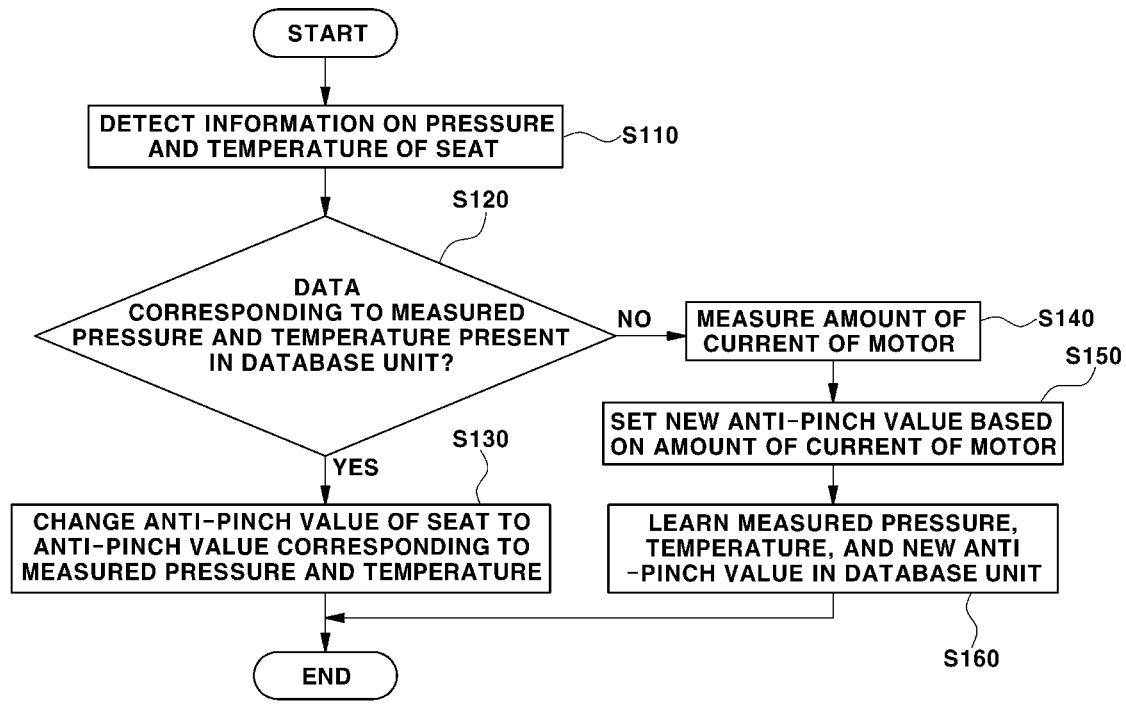
FIG. 5 is a flowchart showing an anti-pinch control method according to a modified example of an embodiment of the present disclosure.

FIG. 5 is a flowchart showing an anti-pinch control method according to a modified example of an embodiment of the present disclosure.

Referring to FIGS. 1, 2, and 5, the pressure sensor 110 may measure the pressure applied to the seat 10, and the temperature sensor 130 may measure the temperature of air inside and outside a vehicle. Information on the measured pressure and temperature may be transmitted to the controller 200 (S110).

The database unit 230 may previously store data about variation in a load of the seat 10 depending on the pressure applied to the seat 10 and the temperature of air inside and outside the vehicle. The variation in the load of the seat 10 may refer to the amount of current generated by the motor 50 while the seat 10 is driven. The matching unit 210 may determine whether data about the newly measured pressure and temperature is present in the database unit 230 (S120).

When data matching the data measured by the pressure sensor 110 and the temperature sensor 130 is present in the database unit 230, the calculator 250 may derive an anti-pinch value corresponding to the newly measured pressure and temperature, from the database unit 230. The anti-pinch value derived by the calculator 250 may be set to a new anti-pinch value (that is, a variable anti-pinch value) of the seat 10 (S130).

However, when data that matches the data measured by the pressure sensor 110 and the temperature sensor 130 is not present in the database unit 230, the calculator 250 may not extract an anti-pinch value corresponding to the newly measured pressure and temperature, from the database unit 230. Thus, the calculator 250 may calculate the new anti-pinch value based on the amount of current of the motor 50 (S140).

The calculator 250 may calculate a value obtained by adding a preset value to the measured amount of current of the motor 50 and may set the calculated value to a new anti-pinch value. The preset value may be a value that is varied depending on the amount of current of the motor 50. For example, as the amount of current of the motor 50 increases, the preset value may increase. A condition in which the amount of current of the motor 50 is high may refer to a condition in which it is difficult to drive the seat 10. Thus, when the anti-pinch value is set, as the amount of current of the motor 50 increases, the preset value may increase, and accordingly, driving of the seat 10 may be prevented from being unnecessarily limited (S150).

When the newly measured pressure value and temperature value are not stored in the database unit 230, the database unit 230 may store the newly measured pressure value and temperature value, and the amount of current of the motor 50 and may learn the stored value (S160).

Figure 6:
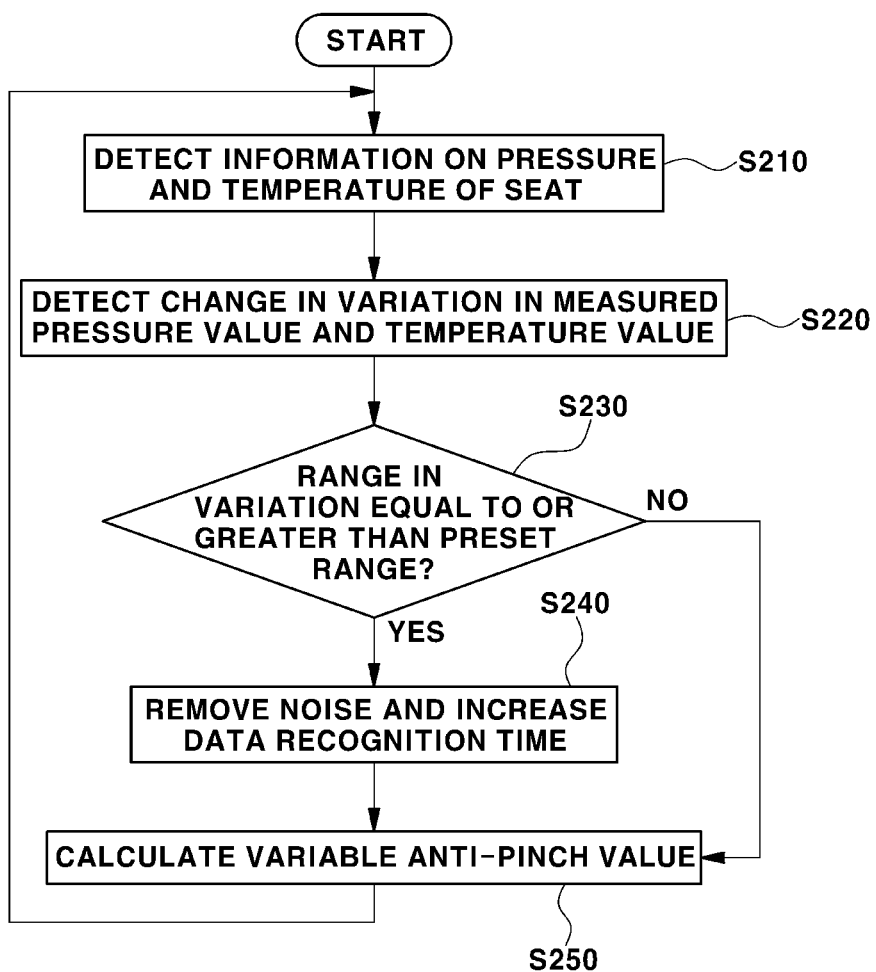
FIG. 6 is a flowchart showing a method of processing noise during a procedure of deriving anti-pinch according to an embodiment of the present disclosure.

FIG. 6 is a flowchart showing a method of processing noise during a procedure of deriving anti-pinch according to an embodiment of the present disclosure.

Referring to FIGS. 1 and 6, the pressure sensor 110 may measure the pressure applied to the seat 10, and the temperature sensor 130 may measure the temperature of air inside and outside a vehicle. Information on the measured pressure and temperature may be transmitted to the controller 200 (S210).

The controller 200 may detect a range of variation in the measured pressure value and temperature value. For example, when an occupant sitting on the seat 10 moves suddenly or children jump on the seat 10, the pressure value applied to the seat 10 may be abruptly changed. When a vehicle parked inside a building in a extreme cold during winter starts traveling, the temperature of the air inside and outside the vehicle may be abruptly changed (S220).

The controller 200 may determine whether the range of variation in the pressure value or the temperature value is equal to or greater than a preset range. When the range of variation in the pressure value or the temperature value is equal to or greater than the preset range, this may be interpreted to mean that abnormal data is measured by sensors. In addition, when the range of variation in the pressure value or the temperature value is equal to or greater than the preset range, this may be interpreted to mean that sensors malfunction (S230).

Upon determining that the range of variation in the pressure value or the temperature value is equal to or greater than the preset range, the controller 200 may determine that data input through sensors is noise and may remove the data, or may increase the time spent obtaining data. The controller 200 may analyze the pressure applied to the seat 10 and the temperature of air inside and outside the vehicle during a preset time for obtaining data. However, when the range of variation in the pressure value or the temperature value is equal to or greater than the preset range, the controller 200 may increase the preset time for obtaining data and may analyze the pressure applied to the seat. The controller 200 may derive an average of each of the pressure value and the temperature value during the time for obtaining data, and may calculate an anti-pinch value using the derived average pressure and temperature values. Thus, as the time for obtaining data is increased compared with a preset time for obtaining data, the reliability of the pressure value and the temperature value for deriving the anti-pinch value may be improved. Upon determining that the range of variation in the pressure value or the temperature value is equal to or greater than the preset range, the controller 200 may determine that data input through sensors is noise, and may remove the data. Thus, the controller 200 may derive an anti-pinch value based only on data having high reliability (S240 and S250).

According to embodiments of the present disclosure, the anti-pinch control system may compare data stored in a database unit with a pressure value and a temperature value that are measured in real time and may calculate a new anti-pinch value. The anti-pinch control system may detect variation in the amount of current of a motor and may calculate a new anti-pinch value. That is, the anti-pinch control system may vary an anti-pinch value in consideration of various factors, thereby overcoming a problem in which driving of a seat is not stopped when a person is pinched by the seat.

The invention has been described in detail with reference to preferred embodiments thereof. However, terms or words used herein shall not be limited to having common or dictionary meanings, and components in the embodiments and the drawings of the specification are merely an exemplary embodiment of the present disclosure, and thus the scope of the present disclosure is not limited to the aforementioned embodiment, and various changes and modifications by one of ordinary skill in the art using the basic concept of the present disclosure defined in the following claims are contained in the scope of the present disclosure.

What is claimed is:

1. An anti-pinch control system comprising:
a motor configured to generate driving force for moving a seat of a vehicle;
a pressure sensor configured to detect a pressure applied to the seat;
a current measurement sensor configured to measure an amount of current generated by the motor;
a database unit configured to store data on an amount of current required to drive the seat that corresponds to the pressure detected by the pressure sensor; and
a controller configured to vary an anti-pinch value of the seat based on data corresponding to the pressure applied to the seat.

2. The anti-pinch control system of claim 1, wherein the controller comprises:
a matching unit configured to match a newly measured pressure and the data stored in the database unit;
a calculator configured to derive the anti-pinch value based on the data matched by the matching unit; and
a motor driver configured to control driving of the seat based on the anti-pinch value.

3. The anti-pinch control system of claim 1, further comprising:
a temperature sensor configured to detect a temperature of air inside and outside the vehicle,
wherein the controller varies the anti-pinch value of the seat based on an amount of current corresponding to the temperature of air inside and outside the vehicle and the pressure applied to the seat.

4. The anti-pinch control system of claim 3, wherein the controller increases the anti-pinch value as a temperature, measured in real time, decreases based on a temperature value corresponding to a currently set anti-pinch value.

5. The anti-pinch control system of claim 1, wherein the controller increases the anti-pinch value as a pressure value, measured in real time, increases based on a pressure value corresponding to a currently set anti-pinch value.

6. The anti-pinch control system of claim 1, wherein the controller analyzes the pressure applied to the seat during a preset data recognition time and increases the preset data recognition time and analyzes the pressure applied to the seat when a range of variation in the pressure is equal to or greater than a preset range.

7. The anti-pinch control system of claim 6, wherein the controller derives an average of the pressure applied to the seat during the new data recognition time and calculates the anti-pinch value based on the average pressure value.

8. The anti-pinch control system of claim 1, wherein the controller analyzes the pressure applied to the seat during a preset data recognition time and processes data measured during the preset data recognition time as noise when a range of variation in the pressure is equal to or greater than a preset range.

9. The anti-pinch control system of claim 1, further comprising:
a temperature sensor configured to detect a temperature of air inside and outside the vehicle, wherein the database unit stores the anti-pinch value calculated by the controller and a temperature and a pressure that match the anti-pinch value; and wherein the controller matches a pressure applied to the seat and a temperature of the vehicle, which are newly measured, and data of the database unit, and sets the matching anti-pinch value to a new anti-pinch value.

10. The anti-pinch control system of claim 1, wherein the controller matches a pressure applied to the seat and a temperature of the vehicle, which are newly measured, and data of the database unit;

wherein the controller calculates a value obtained by adding a preset value to the matched amount of current, as the anti-pinch value; and wherein the preset value is a value varied depending on the amount of current.

11. The anti-pinch control system of claim 1, wherein the anti-pinch value is a limiting value of the amount of current required by a motor depending on a load applied to the seat; and wherein the controller stops driving the seat when the current measurement sensor detects an amount of current equal to or greater than the anti-pinch value.

12. An anti-pinch control system comprising:
a motor configured to generate driving force for moving a seat of a vehicle;
a pressure sensor configured to detect a pressure applied to the seat;
a temperature sensor configured to detect a temperature of air inside and outside the vehicle,
a database unit configured to store data on an amount of current required to drive the seat that corresponds to the pressure detected by the pressure sensor; and
a controller configured to vary an anti-pinch value of the seat based on data corresponding to the pressure applied to the seat.

13. The anti-pinch control system of claim 12, further comprising:
a current measurement sensor configured to measure an amount of current generated by the motor.

14. The anti-pinch control system of claim 12, wherein the controller varies the anti-pinch value of the seat based on an amount of current corresponding to the temperature of air inside and outside the vehicle and the pressure applied to the seat.

15. The anti-pinch control system of claim 12, wherein the controller comprises:
a matching unit configured to match a newly measured pressure and the data stored in the database unit;
a calculator configured to derive the anti-pinch value based on the data matched by the matching unit; and
a motor driver configured to control driving of the seat based on the anti-pinch value.

16. The anti-pinch control system of claim 12, wherein the controller derives an average of the pressure applied to the seat during the new data recognition time and calculates the anti-pinch value based on the average pressure value.

17. An anti-pinch control system comprising:
a motor configured to generate driving force for moving a seat of a vehicle;
a pressure sensor configured to detect a pressure applied to the seat;
a database unit configured to store data on an amount of current required to drive the seat that corresponds to the pressure detected by the pressure sensor; and
a controller configured to vary an anti-pinch value of the seat based on data corresponding to the pressure applied to the seat,
wherein the database unit stores the anti-pinch value calculated by the controller and a temperature and a pressure that match the anti-pinch value.

18. The anti-pinch control system of claim 17, further comprising:
a temperature sensor configured to detect a temperature of air inside and outside the vehicle.

19. The anti-pinch control system of claim 17, wherein the anti-pinch value is a limiting value of the amount of current required by a motor depending on a load applied to the seat; and
wherein the controller stops driving the seat when the current measurement sensor detects an amount of current equal to or greater than the anti-pinch value.

20. The anti-pinch control system of claim 17, wherein the controller matches a pressure applied to the seat and a temperature of the vehicle, which are newly measured, and data of the database unit;
wherein the controller calculates a value obtained by adding a preset value to the matched amount of current, as the anti-pinch value; and
wherein the preset value is a value varied depending on the amount of current.

* * * * *